United States Patent [19]

Ichimura

[11] Patent Number: 6,050,247

[45] Date of Patent: Apr. 18, 2000

[54] INTERNAL COMBUSTION ENGINES, FLUID FUEL REFORMING CERAMIC CATALYST AND TRANSPORTING AND POWER-GENERATING MEANS EMPLOYING THEM

[75] Inventor: Shoji Ichimura, Shizuoka, Japan

[73] Assignee: Fukuyo Ichimura, Shizuoka, Japan

[21] Appl. No.: 09/314,089

[22] Filed: May 18, 1999

Related U.S. Application Data

[62] Division of application No. 08/907,367, Aug. 7, 1997.

[51] Int. Cl.⁷ ..................................... F02N 33/00
[52] U.S. Cl. ................................................ 123/538
[58] Field of Search ..................... 123/536, 537, 123/538

[56] References Cited

U.S. PATENT DOCUMENTS

| | | | |
|---|---|---|---|
| 4,930,483 | 6/1990 | Jones | 123/538 |
| 5,044,346 | 9/1991 | Tada et al. | 123/538 |
| 5,044,347 | 9/1991 | Ullrich et al. | 123/538 |
| 5,092,303 | 3/1992 | Brown | 123/538 |
| 5,404,913 | 4/1995 | Gilligan | 123/538 |
| 5,863,404 | 1/1999 | Fujimaki | 123/538 |
| 5,873,353 | 2/1999 | Makita | 123/538 |

*Primary Examiner*—Marguerite McMahon
*Attorney, Agent, or Firm*—Burgess, Ryan & Wayne

[57] ABSTRACT

A catalyst for improving combustion of fluid fuels which comprises three layers. An inner or core layer of complex oxides of a mixture of Mn, Ni, Co and Cu; an intermediate layer containing alumina and silicate and optionally silicon carbide and an outer layer comprising a fired mixture of a Pt—Pd,Rh alloy on $Al_2O_3$, Mo—$Al_2O_3$, mixed oxides of La—Sr—Co and at least one of Vanadium oxide on alumina and Ag on Alumina. The catalyst can contact the fluid fuel in a storage tank, in a pipeline or in a combustion chamber. The invention also comprises combustion engines which incorporate the described catalyst.

16 Claims, 10 Drawing Sheets

INTERNAL COMBUSTION ENGINES, FLUID FUEL REFORMING CERAMIC CATALYST AND TRANSPORTING AND POWER-GENERATING MEANS EMPLOYING THEM

This is a division of application Ser. No.: 08/907,367, filed on Aug. 7, 1997 by Shoji ICHIMURA For: INTERNAL COMBUSTION ENGINES, FLUID FUEL REFORMING CERAMICS CATALYST . . . MEANS EMPLOYING THEM.

BACKGROUND OF THE INVENTION

This invention relates to internal combustion engines and more particularly, to a fluid fuel reforming ceramic catalyst that effectively increases combustion efficiency and decreases obnoxious substances in gasoline, light oil and other liquid fuels and natural gas and other gaseous fuels by reforming them and to transporting and power-generating means employing such internal combustion engines using the catalyst.

Gasoline, for example, contains approximately 30 percent of benzene, acetaldehyde and other difficultly combustible and environment polluting substances and approximately 10 percent of octane-number increasing substances, anti-freeze agents and other additives, in addition to approximately 60 percent of combustible substances. The difficultly combustible and environment polluting substances are discharged as obnoxious substances in exhaust gases as a result of incomplete combustion. Reforming these difficultly combustible and environment polluting substances into combustible substances will increase the ratio of combustible substances that are conducive to efficient combustion.

To efficiently burn the reformed substances, however, the oxygen supply (or air supply) must be increased. However, larger quantities of air inevitably contain greater amounts of nitrogen. Then, the content of nitrogen oxides in the exhaust gases inevitably increases. Although some air is dissolved in fuels, not all of the oxygen contained in the dissolved air contributes to the combustion reactions. If the dissolved oxygen not contributing to the combustion reactions is activated, then the additional combustible substances obtained by reforming difficultly combustible and environment polluting substances can be efficiently burned without increasing the amount of air supplied from the outside.

Accordingly, efficient burning of combustible substances in internal combustion engines using the fluid fuels mentioned above and in transporting and power-generating means employing such internal combustion engines will be conducive to a reduction in environmental pollution and attainment of higher energy efficiency.

Thus, the object of this invention is to provide catalysts that reform difficultly combustible and environment polluting substances contained in fluid fuels to readily combustible substances, increase combustion efficiency and decrease the content of obnoxious substances in exhaust gases by activating the oxygen in the air dissolved in fuels and internal combustion engine systems utilizing a catalyst and transporting and power-generating means employing such internal combustion engines.

SUMMARY OF THE INVENTION

Figure 1:
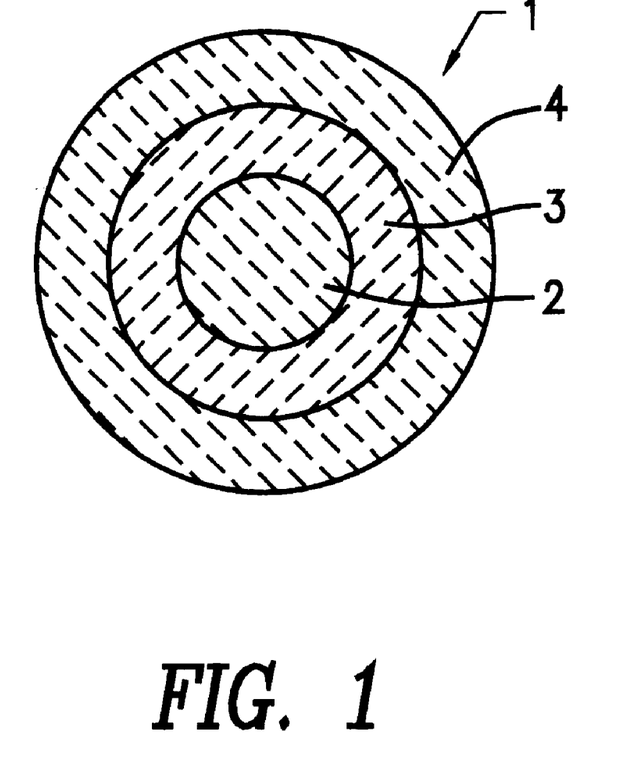
FIG. 1 is a cross-sectional view schematically illustrating the structure of a ceramic catalyst according to the invention.

To solve the above problem, this invention provides a fluid fuel reforming ceramic catalyst 1-comprising, as shown in FIG. 1, a core 2 of a complex oxide ceramic of transition metals, an intermediate layer 3 of an alumina-based silicate ceramic covering the core 2, and an outer layer 4 of a ceramic containing a noble metal alloy covering the intermediate layer, internal combustion engine systems which include the catalyst and transporting means such as automobiles, railroad locomotives, ships and airplanes, and power-generating means which utilize the catalyst in at least any one of the locations where fluid fuel is stored, flows or is burned.

BRIEF DESCRIPTION OF THE DRAWINGS

FIG. 10 is a cross-sectional side elevation view showing coatings in the first embodiment: (a) a coating on the fuel compressing surface of the piston; and in the second embodiment (b) a coating on the inner surface of the cylinder that faces the fuel compressing surface of the piston.

DETAILED DESCRIPTION OF THE INVENTION

As stated, the core 2 of a reforming ceramic catalyst 1 for use with fuel for internal combustion engines, according to this invention, comprises a complex oxide ceramic of transition metals having an oxidation-reduction catalytic action that regenerates the outer layer 4 and intermediate layer 3 when their catalytic activity is lost due to contamination by trace amounts of sulfur, lead and other inorganic substances contained in fuels. Electrons in the substance making up the core 2 move to the intermediate layer 3 and the outer layer 4 and reduce the substances making up the intermediate and outer layers that have been contaminated by catalyst-poisoning impurities. With the activity of the contaminated intermediate and outer layers thus regenerated, their catalytic activities are restored.

The core 2 comprises a complex oxide ceramic of transition metals containing $MnO_2$, NiO, CoO and CuO. Preferably, the core 2 contains 40 to 70 parts of $Mno_2$, and 10 to 20 parts each of NiO, CoO and CuO, all by weight. The four substances described above are essential. If any of them is absent or present in other ranges than those described above, a perovskite-type crystal structure having sites to store electrons contributing to the oxidationreduction action is not formed and, as a consequence, the regenerating function decreases significantly. The catalysts used in this invention may contain other substances unless they have detrimental effects on the oxidation-reduction catalytic action.

The intermediate layer 3 of the reforming ceramic catalyst used in this invention functions to reform the difficultly combustible and environment polluting substances contained in fuels to easily combustible substances. For example, benzene contained in gasoline is believed to be reformed to methane, propane or other combustible substances with the benzene ring linkage severed and the hydrogen resulting from the decomposition of water by the catalytic action of the outer layer described later carrying out hydrogenation. Acetaldehyde is believed to be decomposed to methane, hydrogen and carbon dioxide by reacting with the hydrogen and oxygen ions resulting from the decomposition of water by the catalytic action of the outer layer 4.

The intermediate layer 3 preferably is formed from a mixture which comprises or consists essentially of a silicate ceramic consisting essentially of alumina (i.e., alumina-based) and a silicate optionally mixed with silicon carbide, or , preferably, alumina, an aluminum silicate such as kaolin and silicon carbide. Preferably, the intermediate layer comprises or consists essentially of about 70 to about 90 parts of $Al_2O_3$ and about 10 to about 30 parts of silicate alone or admixed with silicon carbide or, preferably, a mixture of about 5 to about 10 parts of kaolin and about 5 to about 20 parts of silicon carbide preferably β-silicon carbide, all by weight. $Al_2O_3$ mainly functions as a carrier of the silicate having a catalytic action. While a deficiency of $Al_2O_3$ leads to a lowering of mechanical strength, an excess decreases the quantity of silicate carried and impairs the catalytic action. Silicates such as aluminum silicate, magnesium silicate or mixtures containing these materials are useful.

The outer layer of the reforming ceramic used in this invention functions to activate the oxygen in the air contained in fuels and evolve hydrogen and nascent oxygen by decomposing the water contained in the fuel. Therefore, the readily combustible substances increased by reforming can be burned without increasing the air supply by additional air from the outside.

The outer layer 4 of the catalyst preferably comprises or consists essentially of a ceramic formed by firing a mixture containing a noble metal alloy comprising a fired mixture of a Pt—Pd—Rh alloy and $Al_2O_3$, Mo—$Al_2O_3$ in a weight ratio of about 3:1 to about 1:3, a mixed oxide of La—Sr—$Co_3$ in a molar ratio of about 3:1:2 to about 1:3:6 and at least one of an $Al_2O_3$-carried vanadium oxide at a weight ratio of at least 1:3 to about 1:18 and/or a Ag—$Al_2O_3$ in a weight ratio of about 1:3 to about 1:18. At least one of the $Al_2O_3$-carried vanadium oxide and Ag—$Al_2O_3$ is required.

Preferably, the outer layer 4 is formed by firing about 15 to about 25 parts each of the fired mixture of Pt—Pd—Rh alloy and $Al_2O_3$, Mo—$Al_2O_3$, a mixed La—Sr—$Co_3$ oxide, $Al_2O_3$-carried vanadium oxide and/or Ag—$Al_2O_3$, all by weight. When the contents of the constituents are outside the ranges described above, the desired ceramic catalyst is difficult to form by firing, with a resulting decrease in the quantities of oxygen activated and water decomposed.

Preferably, the Pt—Pd—Rh alloy contains a ratio of Pt:Pd of about 7:1 to about 5:3, a ratio of Pt:Rh of about 7:1 to about 5:3 and a ratio of Pd to Rh of from about 3:1 to 1:3 by weight. The Pt—Pd—Rh alloy and $Al_2O_3$, are preferably mixed at a weight ratio of about 2:3 to about 1:1. $Al_2O_3$ mainly functions as a carrier of Pt—Pd—Rh alloy having a catalytic action. While a deficiency of $Al_2O_3$, leads to a lowering of mechanical strength, an excess decreases the quantity of metal components carried and impairs the catalytic activity. The fired mixture is prepared by firing a mixture of Pt—Pd—Rh alloy and $Al_2O_3$ at a temperature of about 850° to about 930° C.

The Mo—$Al_2O_3$ component comprises Mo carried by $Al_2O_3$ at a ratio of about 3:1 to about 1:3 preferably at a ratio by weight of about 1:1. Preferably the mixed La—Sr—$Co_3$ oxide component comprises a fired mixture of lanthanum oxide, strontium oxide and cobalt oxide in a mole ratio of about 3:1:2 to about 1:3:6 preferably about 1:1:2. Preferably the $Al_2O_3$-carried vanadium oxide catalyst component comprises or consists essentially of a ratio of about 3:1 to about 18:1 preferably about 9:1 of $Al_2O_3$ to vanadium oxide by weight. Preferably the Ag—Al2O3 catalyst component comprises or consists essentially of Ag carried by Al2O3 at a ratio of Ag: $Al_2O_3$ by weight of about 1:3 to about 1:18 and preferably about 1:9.

The outer and intermediate layers 4 and 3 are porous having pores that allow the passage of gases and liquids to and from the outside. The core 2 can also be porous, preferably the porosity is greater in the intermediate and outer layers 3 and 4 than in the core, and allows the passage of gases and liquids to and from the outside.

The boundaries between the individual layers are either of a slanted structure in which the composition changes gradually or of a stepped structure in which the composition changes abruptly. It should be noted that the potential energy change is more continuous in the slanted structure than in the stepped structure. This permits electrons to move smoothly at the boundaries, allows oxidation-reduction reactions to proceed smoothly, and thereby enhances the regeneration efficiency of the intermediate and outer layers of the catalyst. Hence, the slanted structure is preferred for the boundaries between the catalyst layers.

Preferably, the ceramic catalysts according to this invention are generally substantially spherical in shape. The catalysts may also be shaped substantially column like. However, in columnar catalysts, it is difficult to maintain a three-layer structure comprising the core and the intermediate and outer layers at both ends thereof where all of them are exposed. By comparison, substantially spherical catalysts maintain a three-layer structure in all directions. Therefore, substantially spherical catalysts are preferred.

The fluid fuels include liquid fuels which are used with internal combustion engines according to this invention and include gasoline, light oils, heavy oils, and kerosene and the gaseous fuels include gases such as town gas, natural gas, propane and butane.

The internal combustion engine systems which include a catalyst according to the invention include, for example, gasoline engines; diesel engines; turbines using gases, heavy oils and other fuels; jet engines, and rotary engines.

The reforming ceramic catalyst is used to contact the fluid fuel in at least one of the locations where fluid fuel is present such as in tanks, in passages (such as pipes), and in the combustion zones where the fuel is burned to take advantage of the regenerating action of the reforming ceramic catalyst.

Now, the manufacturing method of the reforming ceramic catalyst used with the internal combustion engines of this invention will be described in detail.

A. Catalyst Core or Inner Layer

A mixture of powders of $MnO_2$, Nio, CoO and CuO in a desired ratio, with the addition of a binder, is fired at a temperature between about 900° and about 1000° C. The fired product is cooled and then the fired product is pulverized.

The core catalyst is obtained by forming the pre-fired powder thus obtained into, for example, balls of from about 0.5 to about 3 mm in diameter, with the addition of a binder, and sintered at a temperature of approximately 1150° to 1350° C. Sintering is performed in air.

B. Catalyst Intermediate Layer

A mixture of powders containing alumina and a silicate such as kaolin and additionally, silicon carbide in a desired ratio, with the addition of a binder, is fired at a temperature between about 1050° to about 1200° C. The fired product is then pulverized. A paste of the pulverized pre-fired powder thus obtained, is prepared by adding a binder and a foaming agent (which makes the sintered product porous by evolving carbon dioxide or other gases during sintering). The paste thus obtained is then coated over the core to a thickness of, for example, approximately 0.5 to 3 mm and preferably about 0.5 to about 2 mm and most preferably, about 1 mm. Then, the article prepared by coating the paste over the core is sintered at a temperature of approximately 900° to 1100° C. Sintering is performed in air.

In sintering the intermediate layer catalyst at 900° to 1100° C., the substances making up the core and intermediate layer diffuse into each other. Hence, the boundaries between the core and the intermediate layer assumes a slanted structure where the composition changes gradually.

C. Catalyst Outer Layer

A mixture of powders of a fired mixture of Pt—Pd—Rh alloy and $Al_2O_3$, Mo—$Al_2O_3$, mixed La—Sr—Co oxide, and $Al_2O_3$-carried vanadium oxide and/or Ag—$Al2O_3$ in a desired ratio is prepared. The mixture is made into a paste by adding a binder and a foaming agent. The paste is then coated over the fired structure comprising the core or inner layer and the intermediate layer to a thickness of, for example, about 0.5 to about 3 mm preferably about 0.5 to about 2 mm and most preferably, approximately 1 mm. The ceramic catalyst suited for use in this invention is obtained by firing the coated product at a temperature of approximately 600° to 700° C. in a reducing atmosphere.

The fired mixture of Pt—Pd—Rh alloy and $Al_2O_3$ is prepared by mixing a Pt—Pd—Rh alloy and $Al_2O_3$ in a desired ratio and firing the mixture at a temperature of approximately 850° to 930° C.

In firing the outer layer at a temperature between about 600° and about 700° C., the substances making up the intermediate and outer layer of the catalyst diffuse with each other. Hence, the boundaries between the core and the intermediate layer have a slanted structure where the composition changes gradually.

In a preferred manufacturing process of the ceramic catalyst used in this invention, the core or inner layer is formed in a substantially spherical shape during sintering, with the coatings applied sequentially to form the intermediate and outer layers forming substantially spherical crusts. Thus, the finished ceramic catalyst is substantially spherical in its entirety.

When sintering is performed in a cylindrical container, a substantially cylindrically shaped core is formed. Then, the coatings applied subsequently to form the intermediate and outer layers form substantially cylindrical crusts. Thus, the finished ceramic catalyst is substantially cylindrical in its entirety.

Each of the three layers of the catalytic components of the invention are preferably from about 0.5 to about 2.0 millimeters thick although useful catalysts can be formed with at least one of the layers outside the preferred range. Preferably, the catalyst layers are no thicker than about 3 to about 4 mm.

EMBODIMENTS

The following examples describe embodiments of fluid fuel reforming ceramic catalysts used in the internal combustion engines according to this invention, of internal combustion engines employing such reforming ceramic catalysts, and of means employing such internal combustion engines.

A first embodiment is a fluid fuel reforming ceramic catalyst used in an internal combustion engine system according to the invention. The embodiments described below are substantially spherical in their entirety, with the boundaries between the individual catalyst layers being of a slanted structure in which the composition changes gradually at the layer boundaries.

Catalyst Core

To a mixture consisting of 54 g of $MnO_2$, 15 g of NiO, 15 g of CoO and 16 g of CuO, all in powder form, was added 58 ml of a 7 percent by weight aqueous solution of polyvinyl alcohol. The mixture thus obtained was fired at 950° C. and the fired product was pulverized. A paste prepared by adding 30 ml of a 7 percent by weight aqueous solution of polyvinyl alcohol to the pre-fired powder was formed into balls of approximately 2 mm in diameter. The catalyst core was obtained by sintering the balls in 1200° C.

Catalyst Intermediate Layer

To a mixture of 100 g of a mixture of 85 g of alumina, 5 g of kaolin and 10 g of silicon carbide was added 40 ml of a 7 percent by weight aqueous solution of polyvinyl alcohol. The mixture thus obtained was fired at 1150° C. and the fired product was pulverized. A paste was prepared by adding 30 ml of a 7 percent by weight aqueous solution of polyvinyl alcohol and 10 ml of a 12 percent by weight aqueous suspension of calcium carbonate to the pre-fired powder. The paste thus obtained was coated over the ball-shaped core to a thickness of about 1 mm. By sintering the coated ball at 900° C., a structure consisting of the core coated with the porous intermediate layer was obtained.

Catalyst Outer Layer

A mixture consisting of equal amounts of a Pt—Pd—Rh alloy, which consists of Pt, Pd and Rh in a ratio of 3:1:1, and $Al_2O_3$ was fired at approximately 900° C. Then, equal weights of the fired mixture of the Pt—Pd—Rh alloy and $Al_2O_3$t a Mo—$Al_2O_3$ composition (consisting of Mo and $Al_2O_3$ in a ratio of 1:1), a vanadium oxide carried on an $Al_2O_3$ composition (comprising $Al_2O_3$ and vanadium oxide in a ratio of 9:1), an Ag—$Al_2O_3$ composition (comprising Ag and $Al_2O_3$ in a ratio of 1:9) and a $La_{0.5}$—$Sr_{0.5}Co$ mixed oxide composition were mixed (weighing 100 g in total). A paste of the mixture was prepared by adding 30 ml of a 7 percent by weight aqueous solution of polyvinyl alcohol and 10 ml of a 12 percent by weight aqueous suspension of calcium carbonate. The obtained paste was coated over the fired catalyst ball comprising the core and intermediate layer to a thickness of about 1 mm. A three-layer ceramic catalyst was obtained by firing the coated ball at 670° C. in a carbon monoxide atmosphere.

Reforming of Incombustible Substance to a Combustible Substance

Figure 2:
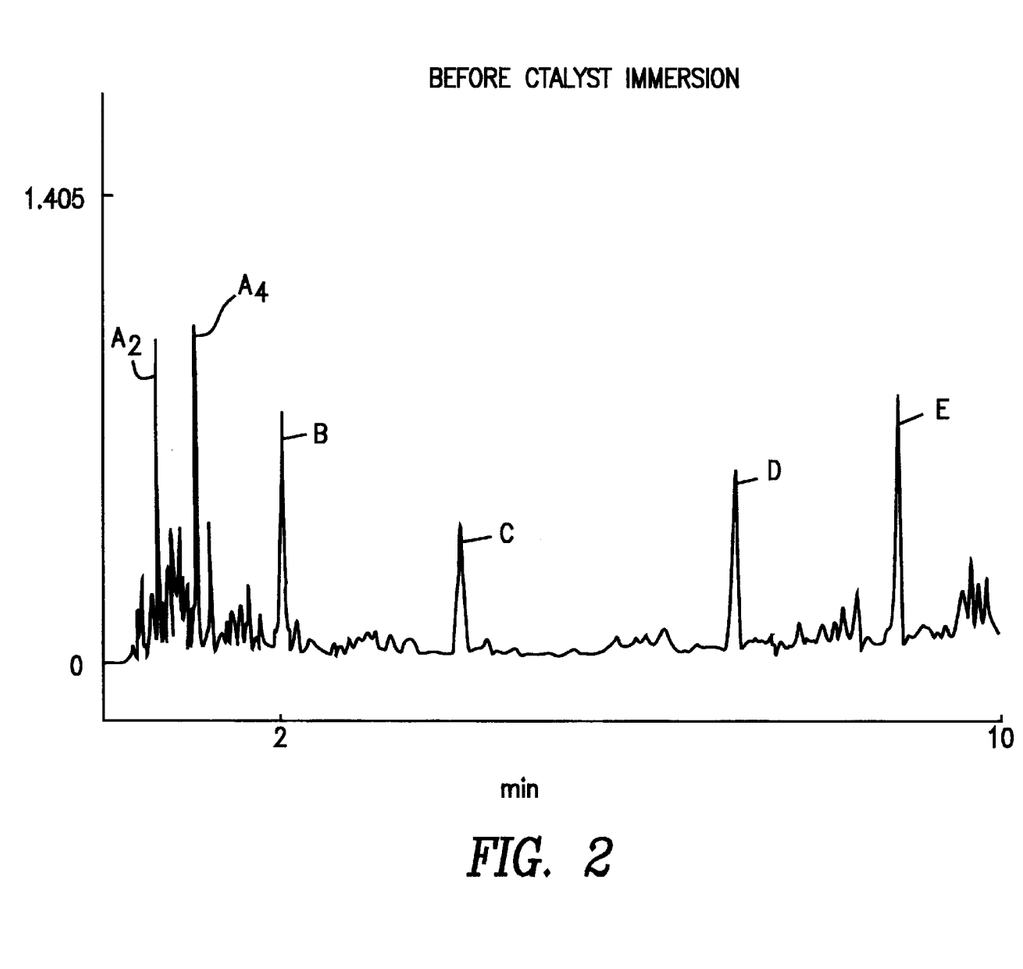
FIG. 2 is a chromatogram showing the composition of a light oil before contact with a catalyst of the invention.
Figure 3:
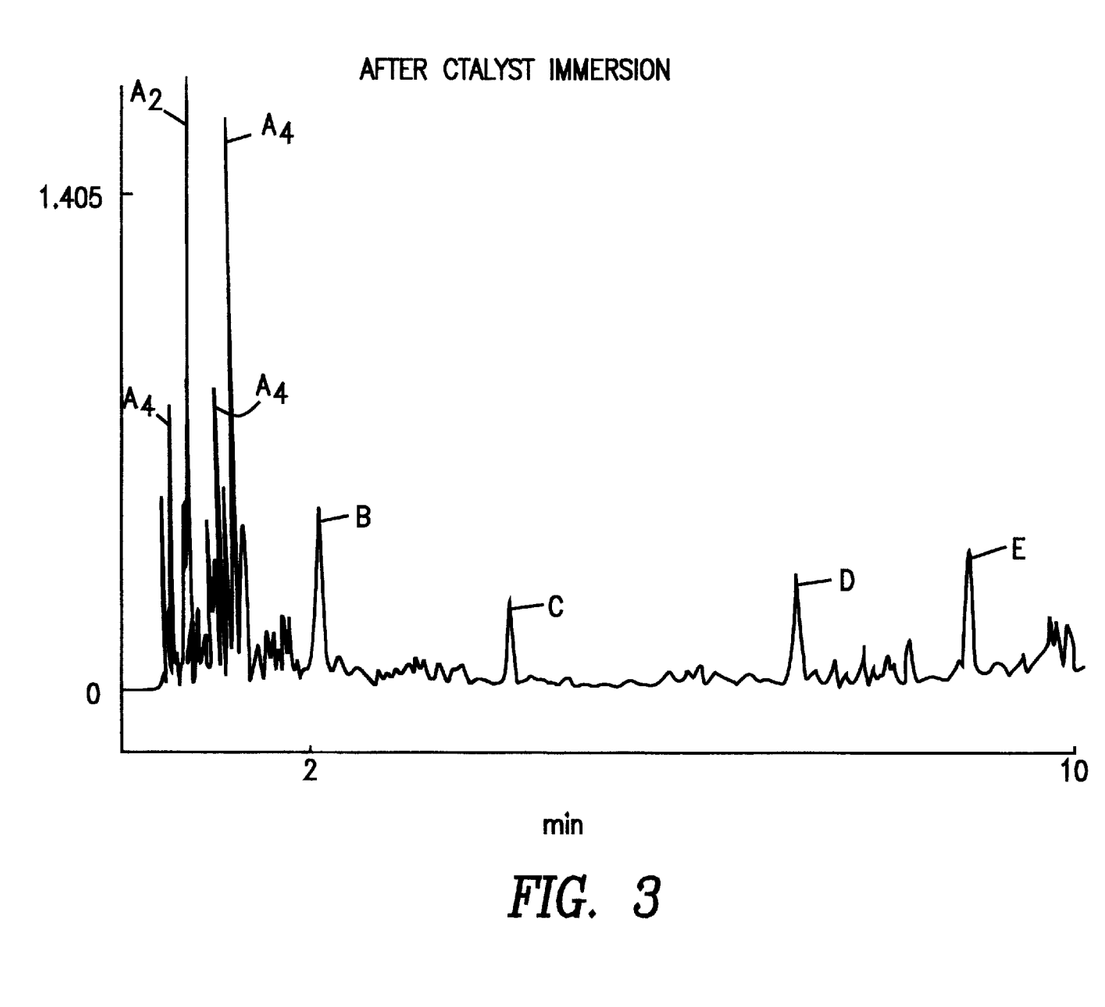
FIG. 3 is a chromatogram showing the composition of a light oil after contact with a catalyst of the invention.

In 1 liter of light oil was immersed 130 mg of the substantially spherical catalyst balls prepared as described above. The light oil was allowed to stand for one hour at room temperature and gas-chromatographed. By using a Hewlett-Packard's 5290 series II chromatograph and an aluminum powder column, chromatography was carried out at 350° C. FIGS. 2 and 3 show chromatograms obtained before and after the immersion of the catalyst balls. In FIGS. 2 and 3, A1 and A2 denote methane-based combustible substances, A3 ethane-, ethylene- and acetylene-based combustible substances, A4 propane- and propylene-based combustible substances, B pentane, C butane, D methylpentene, and E benzene.

As is obvious from the chromatographs, the amount of difficultly combustible substances such as methylpentene and benzene in the fluid fuel, decrease and readily combustible substances increase after immersion of the catalyst in the fuel according to this invention.

Activation of Oxygen Dissolved in Fuel

Figure 4:
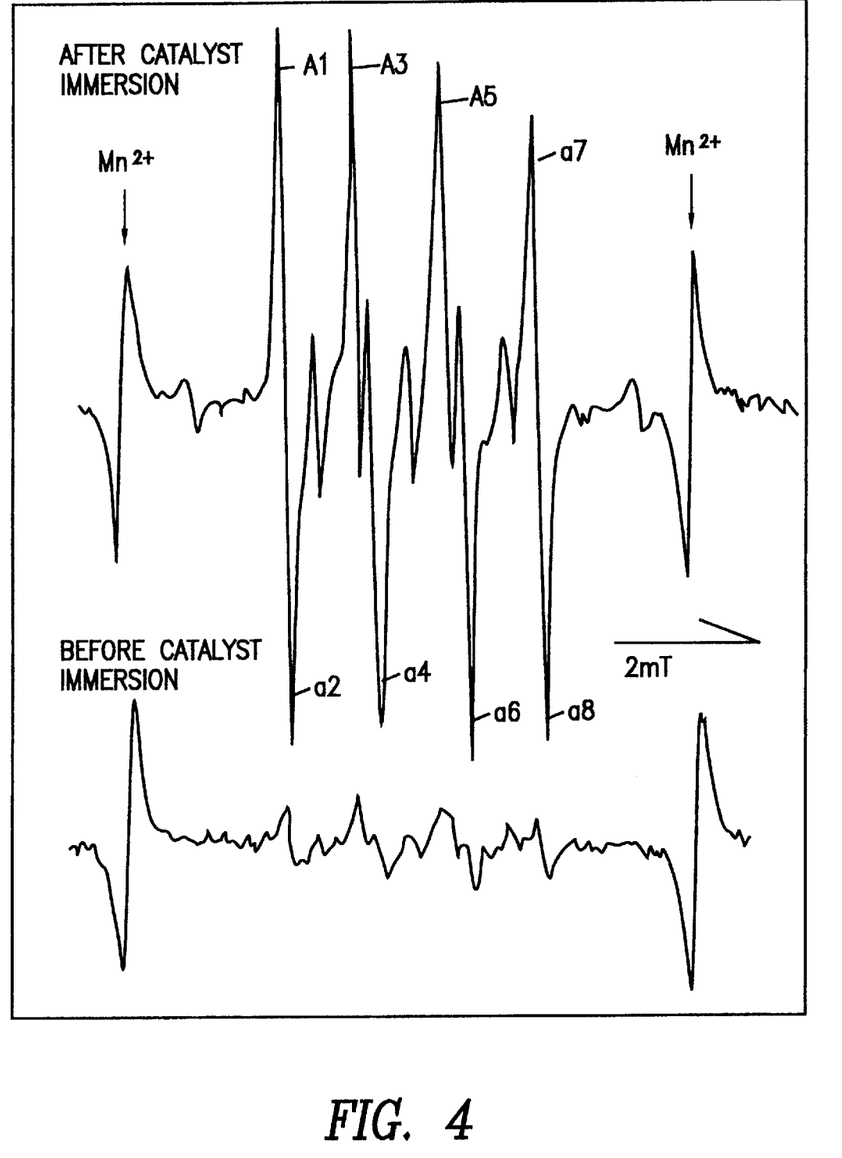
FIG. 4 is an electron spin resonance spectrum showing the formation of oxygen radicals in fuel by contact with the catalyst of the invention.

In 1 liter of gasoline was immersed 130 mg of the catalyst balls prepared as described above. Production of oxygen radicals in the gasoline that was allowed to stand at room temperature for one hour was confirmed by electron spin resonance (ESR) spectrum (FIG. 4). $a_1$ to $a_8$ designate oxygen containing groups.

Decrease of Aldehyde Concentration in Exhaust Gas

Figure 5:
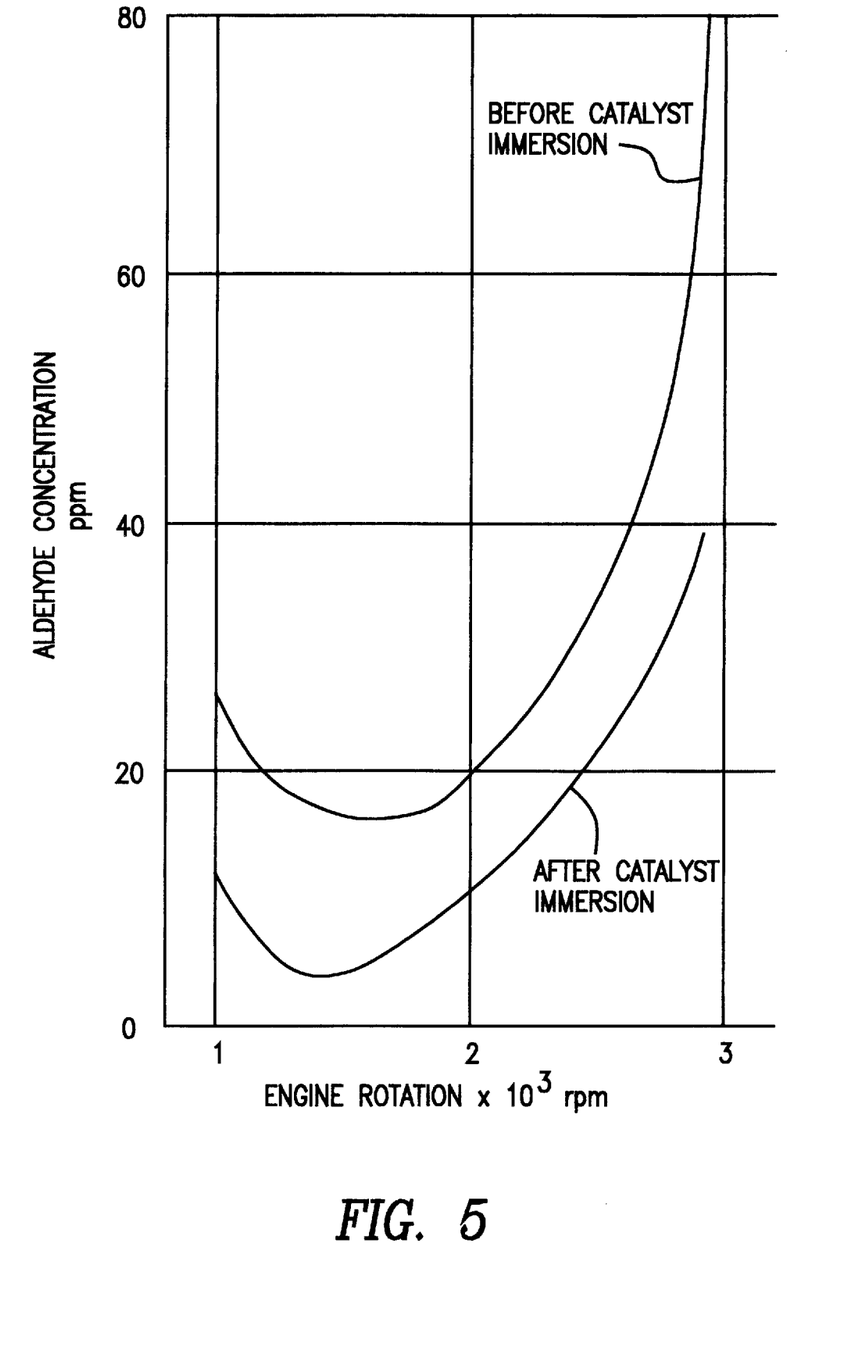
FIG. 5 graphically shows the relationship between the rotating speed of an internal combustion engine and the total aldehyde concentration in the exhaust gas.

Approximately 8 g of the catalyst prepared as described above was immersed for about 3 to 6 hours in fuel tanks (having a capacity of 60 liters) of automobiles equipped with 1200 cc gasoline internal combustion engines, the relationship between the rotating speed of the internal combustion engine and the total aldehyde concentration in the exhaust gas was determined. The concentration of aldehyde in the exhaust gas was determined by measuring the absorption spectrum obtained by infrared spectrum analysis (by using an infrared-ray spectroscope FTIR-2 manufactured by Shimazu Corp.). FIG. 5 shows the results obtained with and without the immersion of the catalyst (averaged over six automobiles). As can be seen in FIG. 5, immersion of the catalyst significantly decreased the total aldehyde concentration irrespective of the engine speed.

Decrease of NOx Concentration in Exhaust Gas

Approximately 8 g of the spherical catalyst prepared as described above were immersed for about 12 hours in the fuel tanks (having a capacity of 60 liters) of automobiles equipped with a 1200 cc gasoline engine, the relationship between the running speed of the automobile and the NOx concentration in the exhaust was determined by gas chromatography.

Figure 6:
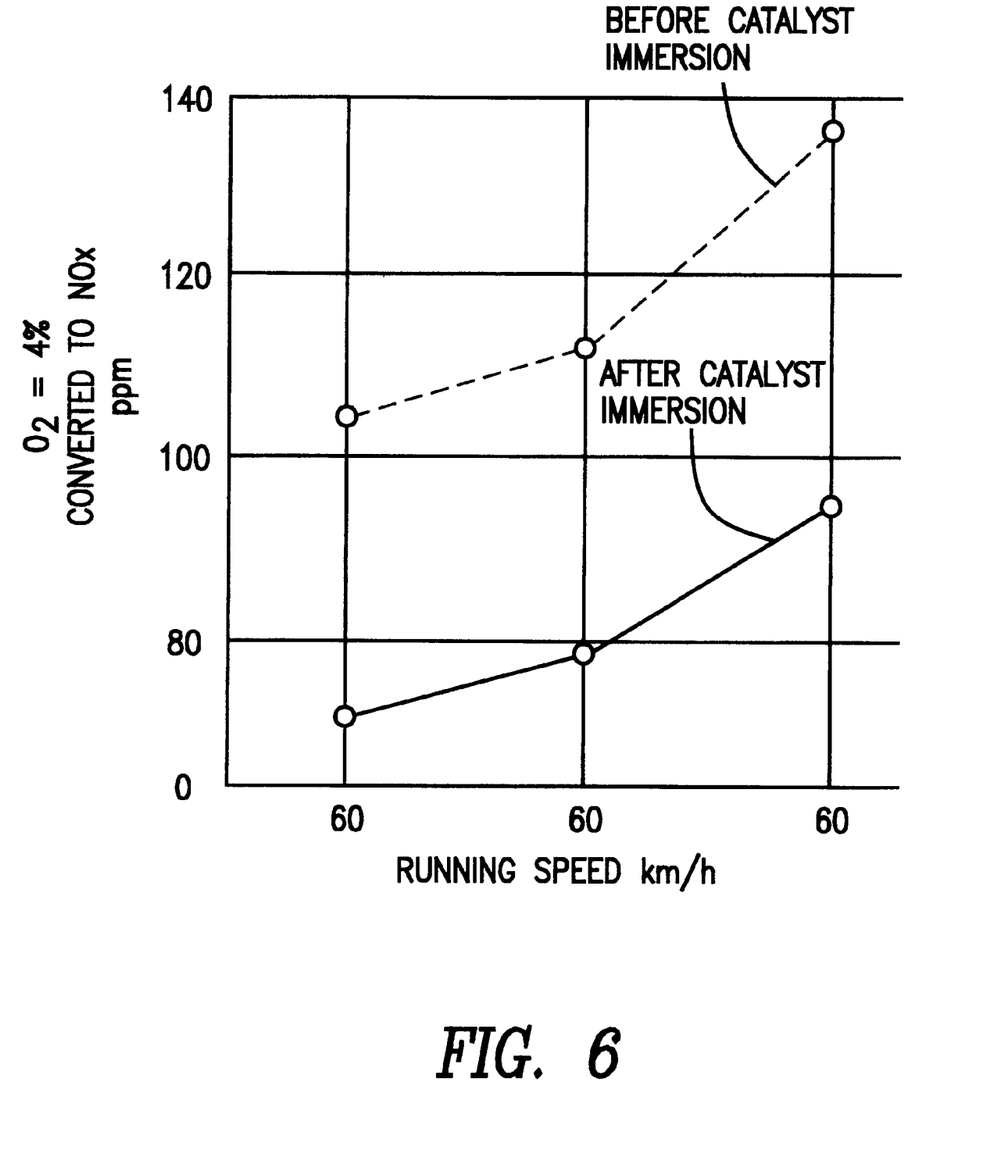
FIG. 6 graphically shows the relationship between the running speed of the automobile and the NOx concentration in the exhaust gas.

FIG. 6 shows the results obtained with and without the immersion of the catalyst. As can be seen in FIG. 6, immersion of the catalyst significantly (by approximately 29 to 33 percent) decreased the NOx concentration in the exhaust gas irrespective of the running speed. The thermal decomposition temperature (ignition point) measured by differential thermal analysis dropped by approximately 7° C. from 278° C. before the immersion of the catalyst to 271° after the immersion. This temperature drop is considered to suppress the evolution of the NOx.

Composition of Combustion Gases in the Cylinders

Figure 7:
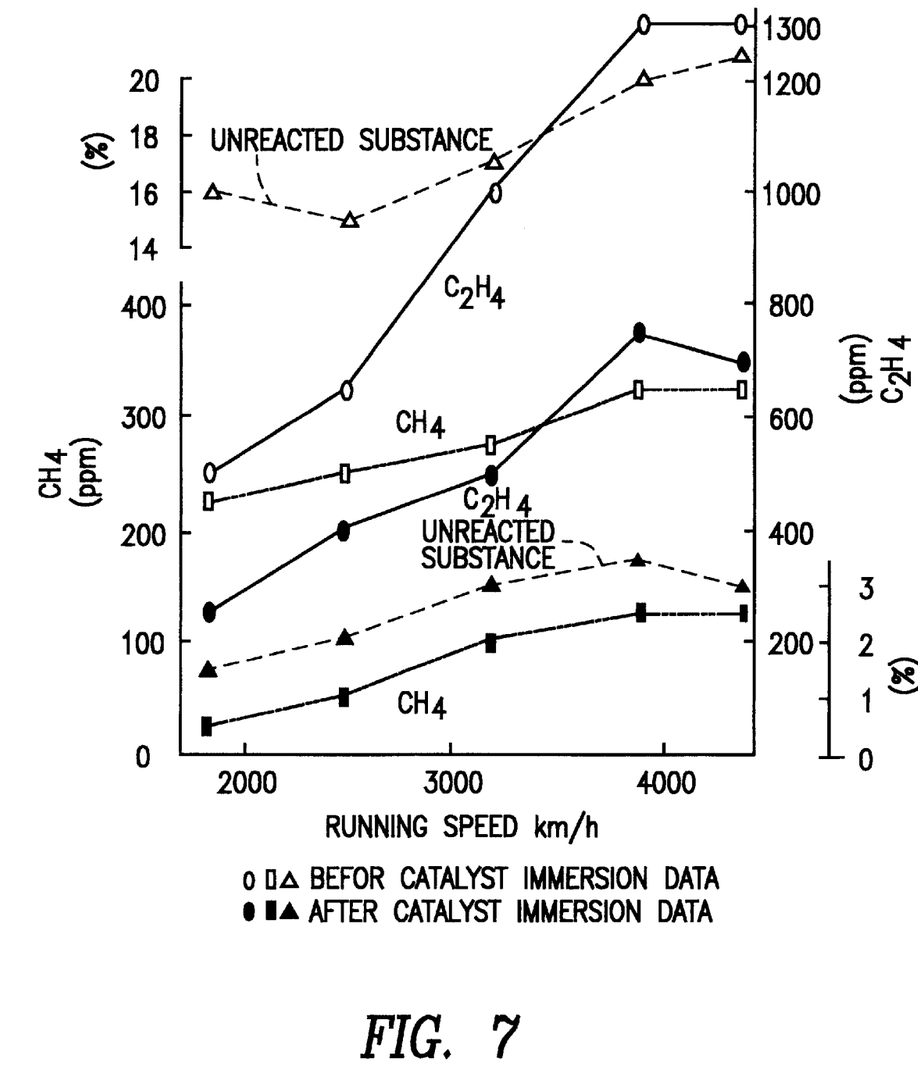
FIG. 7 graphically shows the relationship between the composition of the combustion gas in the engine cylinder and the rotating speed.

Approximately 8 g of the spherical catalyst prepared as described above was immersed for about 12 hours in the fuel tanks (having a capacity of 60 liters) of automobiles equipped with a 1200 cc gasoline internal combustion engine, the composition of combustion gases in the engine cylinders was determined by gas chromatography. Five milliliters of gases discharged when the pistons returned to the original position after ignition and combustion in the cylinders were sampled as specimens. As can be seen, FIG. 7 shows the obtained results. The unreacted substances significantly decreased from approximately 15 to 21 percent before contact with the catalyst to approximately 1.5 to 3.5 percent after contact with the catalyst. The concentrations of methane and ethylene also decreased greatly after contact with the catalyst.

Relationship Between Catalyst and Octane Number

Figure 8:
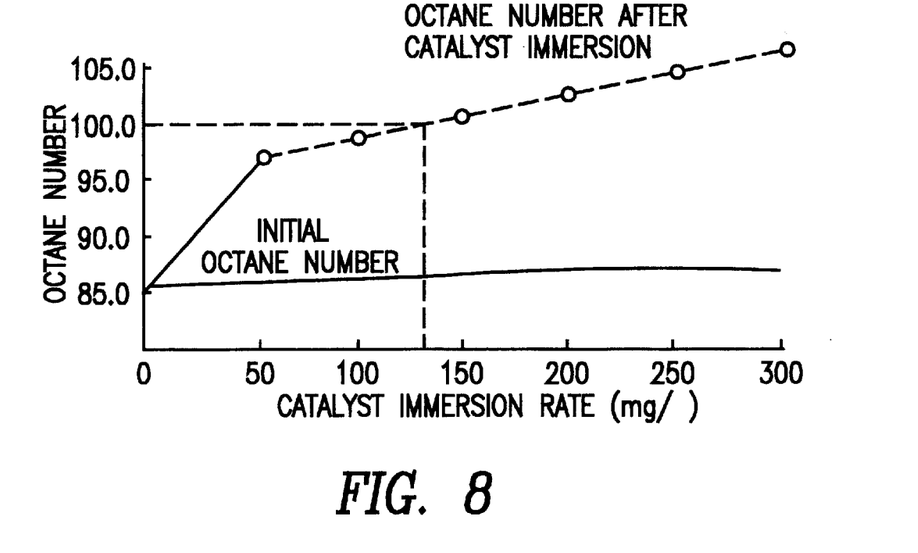
FIG. 8 graphically shows the relationship between the quantity of catalyst used to contact the fuel and the octane number.

Changes in octane number were determined by immersing different quantities of the spherical catalyst prepared as described earlier for about 4 hours in regular gasoline whose initial octane number was approximately 86 before the contact. As shown in FIG. 8, the contact with the catalyst significantly increased the octane number. The octane number increased substantially linearly with an increase in the quantity of the catalyst immersed (mg per liter).

Relationship With Combustion Efficiency

Figure 9:
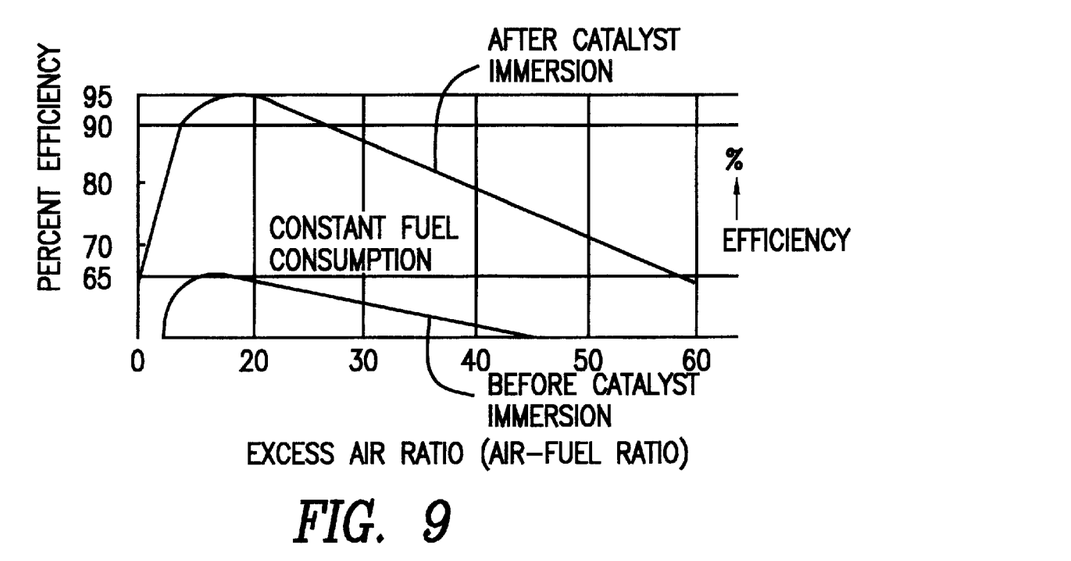
FIG. 9 graphically shows the relationship between the air-fuel ratio and combustion efficiency.

Combustion efficiencies of gasoline internal combustion engines before and after immersing the spherical catalyst prepared alone in regular gasoline at a rate of 130 mg per liter for from about 6 to about 12 hours were determined. FIG. 9 shows the combustion efficiencies before and after the immersion of the catalyst in regular gasoline for from about 6 to about 12 hours. The measurements were taken under the conditions where constant fuel consumption was maintained. As can be seen in FIG. 9, the catalyst contact increased combustion efficiency by approximately 30 percent when the air-fuel ratio was 16.7.

A second embodiment is of the ceramic catalyst of the invention in a location where fuel is burned in an internal-combustion piston engine.

In operation of an internal-combustion engine according to the invention to perform its catalytic function, as stated earlier, ceramic catalyst can be used to contact the fluid fuel, to be supplied to the engine, where the fluid fuel is stored (a tank) where fluid fuel passes (a pipe) from the tank to the engine itself and where the fluid fuel is burned in the combustion chamber of the internal combustion engine (including turbines).

The ceramic catalyst used in operation of the internal combustion engines according to this invention, exerts a more active catalytic action on fluid fuel when used in a high-temperature environment in which fluid fuel is burned. The effectiveness of the catalyst of the invention increases as the temperature increases.

Figure 10A:
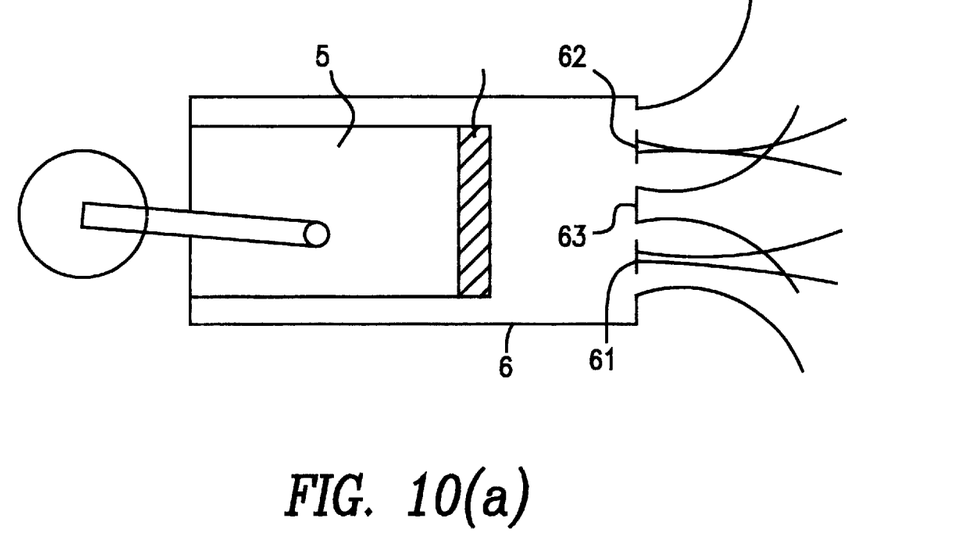
Figure 10B:
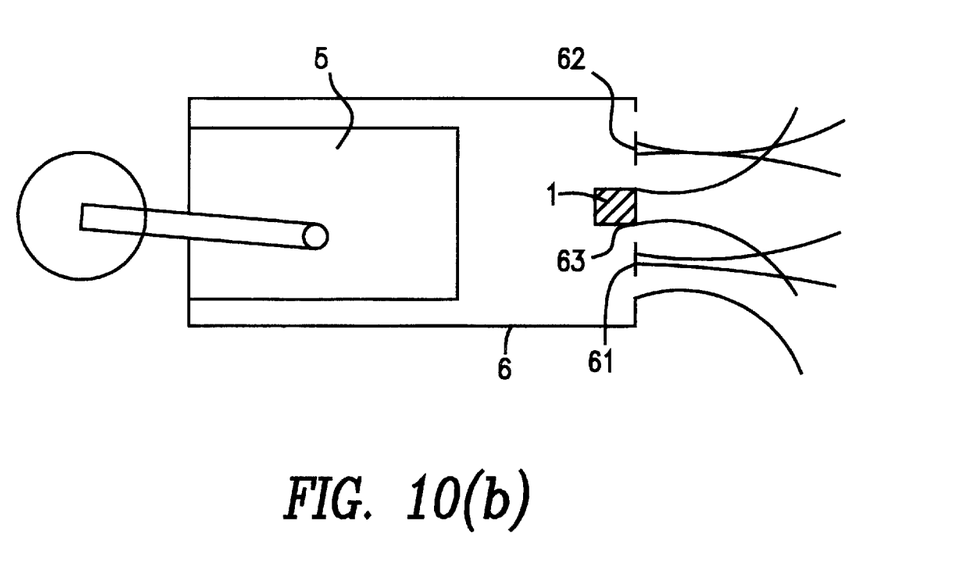

In the second embodiment, which is an internal-combustion piston engine, at least one of, the surface of the piston 5 that compresses a mixture of air and fluid fuel and the surface 63 of the cylinder that faces said surface of the piston is coated with a ceramic catalyst, as shown in FIG. 10(a) and (b). In FIG. 10(a) and (b), 61 denotes an exhaust valve and 62 denotes an intake valve.

This coating can be obtained by firing a pre-fired three-layer ceramic catalyst on at least one of said two surfaces at a temperature higher than the initial firing temperature (actually at 1500° C. or above) or by coating an inner layer (adjacent the engine part), an intermediate layer and an outer layer by firing on either one of said two surfaces, in the order mentioned, according to the method described earlier.

The ceramic catalyst 1 thus coated on at least one of the piston 5 or cylinder head 63 facing the end of the piston exhibits a catalytic action when the fluid fuel is burned. Then, an increase in octane number, conversion of incombusitible substances to combustible ones, activation of dissolved oxygen, reduction of the concentration of NOx and combustible substances in exhaust gases, and improvement of combustion efficiency are achieved, similar to those described in the first embodiment.

When internal combustion engines with the piston coated with a three layer catalyst similar to the first embodiment of this invention are used with automobiles, diesel locomotives, ships, propeller-driven airplanes and other transporting and power-generating means, the preferable actions and effects of this invention are obtained.

The coating of the ceramic catalyst remains unmelted in the cylinders of gasoline, diesel and other engines as the temperature in the cylinders usually does not exceed about 1000° C.

Still, care should be taken to keep the temperature in the cylinder within the limits where the coated ceramic catalyst remains unmelted.

Figure 11:
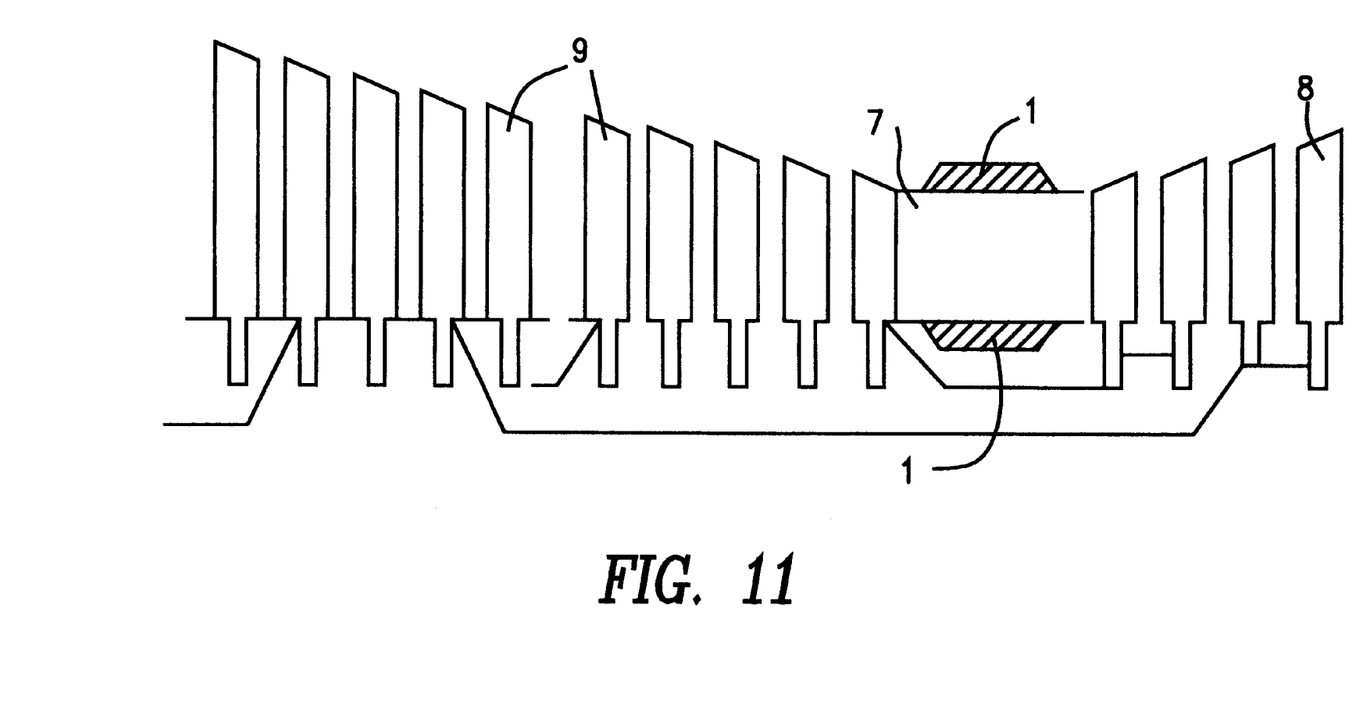
FIG. 11 is a cross-sectional side elevation view showing a coating of a ceramic catalyst according to this invention on the combustion chamber of a fluid fuel fired turbine.

A third embodiment is an internal combustion engine comprising a turbine. In a turbine, high-pressure gas produced by the compression and combustion of fluid fuel in air is blown against the turbine blades 8, as shown in FIG. 11 wherein 7 denotes a combustion chamber and 9 denotes the compressing means. The third embodiment has a three layer ceramic catalyst 1 according to the invention coated on the inner wall of the combustion chamber 7 where fluid fuel is burned.

The catalyst's coating can be formed by firing a pre-fired three-layer ceramic catalyst on the inner wall of combustion chamber 7 or by coating a core layer, an intermediate layer and an outer layer on the inner wall of combustion chamber 7 by firing, in the order mentioned, as in the case of the second embodiment.

The catalyst 1 increases the combustion efficiency of internal combustion engines using turbines. This also increases the energy efficiency of transporting means such as railroad locomotives and ships, and power-generating means at power stations using such turbines and decreases environmental pollution.

Care must be taken to keep the temperature within the limits where the coated ceramic catalyst remains unmelted, as in the case of the second embodiment.

As discussed above, the ceramic catalysts according to this invention, when used in storage tanks, passages (pipes) and combusting (the surface of a piston pressing the fluid fuel and the facing end of the cylinder of piston-driven engines and the combustion chamber of turbine-driven internal combustion engines) areas of piston-, turbine- or jet-driven internal combustion engines, enhance fuel economy and decrease noxious substances in exhaust gases by reforming the difficultly combustible and environment-polluting substances in fluid fuels to more readily combustible substances, activating the oxygen contained in fluid fuels, and evolving nascent oxygen by decomposing the water contained in fluid fuels.

I claim:

1. A power generating apparatus which comprises:
a fuel storage zone for a fluid hydrocarbon fuel, an internal combustion engine comprising a combustion chamber zone wherein a mixture of the hydrocarbon fuel and an oxygen containing gas are burned and a conduit means zone is in fluid communication with the fuel storage zone and the combustion chamber zone, through which the fluid fuel passes from the fuel storage zone to the combustion chamber zone, wherein a hydrocarbon fuel reforming catalyst is arranged to contact the hydrocarbon fuel in at least one zone selected from the group consisting of the fuel storage zone, the combustion chamber zone and the conduit zone, the fuel reforming catalyst comprising a complex oxide ceramic of transition metals, an intermediate layer of a ceramic containing alumina and a silicate in which the main component is alumina covering the complex ceramics and an outer layer of a ceramic containing a noble metal alloy covering the intermediate layer.

2. The power generating apparatus of claim 1 wherein the internal combustion engine comprises a piston engine.

3. The internal combustion engine of claim 2 wherein the catalyst is arranged on a surface of a piston facing the combustion zone.

4. The power generating apparatus of claim 1 wherein the internal combustion engine comprises a turbine engine wherein the catalyst is arranged on an internal surface of a combustion zone.

5. The apparatus of claim 1 wherein the catalyst comprises (a) a core or inner layer consisting essentially of complex oxides of transition metals comprising an alumina-based silicate ceramic comprising alumina and a silicate and optionally, silicon carbide;

(c) an outer layer comprising a ceramic containing a fired mixture of a Pt—Pd—Rh alloy and $Al_2O_3$, Mo and $Al_2O_3$, a mixed oxide of La—Sr—Co and at least one of V oxide on $Al_2O_3$ and Ag on $Al_2O_3$.

6. The apparatus of claim 5 wherein the three catalyst layers are sufficiently porous to permit the fluid fuel to contact the three layers of the catalyst.

7. The apparatus of claim 6 wherein each of the three catalyst layers independently has a thickness of from about 0.5 to about 3 mm.

8. The apparatus of claim 1 wherein the complex oxide ceramic of transition metals is formed by firing a mixture which consists essentially of about 40 to about 70 parts by weight $MnO_2$ and about 10 to about 20 parts by weight of each of NiO, CoO and CuO.

9. The apparatus of claim 1 wherein the intermediate layer is formed by firing a mixture comprising from about 10 to about 80 parts by weight of $Al_2O_3$ and about 10 to about 30 parts by weight of a silicate.

10. The apparatus of claim 1 wherein the silicate comprises at least one member selected from the group consisting of aluminum silicate, and alumina and silica containing clay.

11. The apparatus of claim 1 wherein the outer layer is formed by firing a mixture comprising from about 15 to about 25 parts by weight of each of (a) a fired mixture of $Al_2O_3$ and an alloy containing Pt, Pd, and Rh in a weight ratio of Pt; Pd of from about 7:1 to about 5:3, a weight ratio of Pt; Rh of from about 7:1 to about 5:3 at a ratio of Pd to Rh of from about 4:6 to about 1:1;

(b) Mo carried by $Al_2O_3$ in a ratio by weight of 3:1 to about 1:3;

(c) a fired mixture of lanthanum oxide, strontium oxide and cobalt oxide, a mole ratio of about 3:1:2 to about 1:3:6;

(d) at least one member selected from the group consisting of vanadium oxide carried on $Al_2O_3$ in a rate ratio of from about 1:3 to about 1:18 and silver carried on $Al_2O_3$ in a weight ratio of about 1:3 to about 1:18.

12. The apparatus of claim 1 wherein the catalyst is in a substantially spherical form.

13. The apparatus of claim 1 wherein the catalyst is in the form of a layer on a non-catalytic substrate.

14. The apparatus of claim 1 wherein the complex oxide ceramic consists essentially of a fired mixture of about 54 parts $MnO_2$ by weight, about 15 parts NiO by weight, about 15 parts CoO by weight and about 16 parts CuO by weight.

15. The apparatus of claim 14 wherein the intermediate layer consists essentially of a fired mixture of about 85 parts alumina by weight, about 5 parts kaolin by weight, and about 10 parts silicon carbide by weight.

16. The apparatus of claim 15 wherein the outer layer consists essentially of a fired mixture of about 20 parts by weight of a fired mixture of about 50 parts by weight of $Al_2O_3$ and about 50 parts by weight of Pt, Pd, Rh alloy having a Pt, Pd, Rh ratio by weight of about 3:1:1; about 120 parts by weight of a Mo—$Al_2O_3$ composition and a weight ratio of Mo to $Al_2O_3$ of about 1:1; about 20 parts by weight of vanadium oxide and $Al_2O_3$ in a weight ratio of vanadium oxide: $Al_2O_3$ of about 1:9; and about 20 parts by weight of Ag—$Al_2O_3$ in a weight ratio of about 1:9; and about 20 parts of a mixed oxide of $La_{0.5}$—$Sr_{0.5}$—Co.

* * * * *